Feb. 14, 1961    R. W. VOGES ET AL    2,971,547
POWER OPERATED ADJUSTMENT FOR MOULDERS
Filed March 31, 1958    6 Sheets-Sheet 1

INVENTORS.
ROBERT W. VOGES AND
ORVILLE E. MOWERY
BY
Harold B. Hood
ATTORNEY.

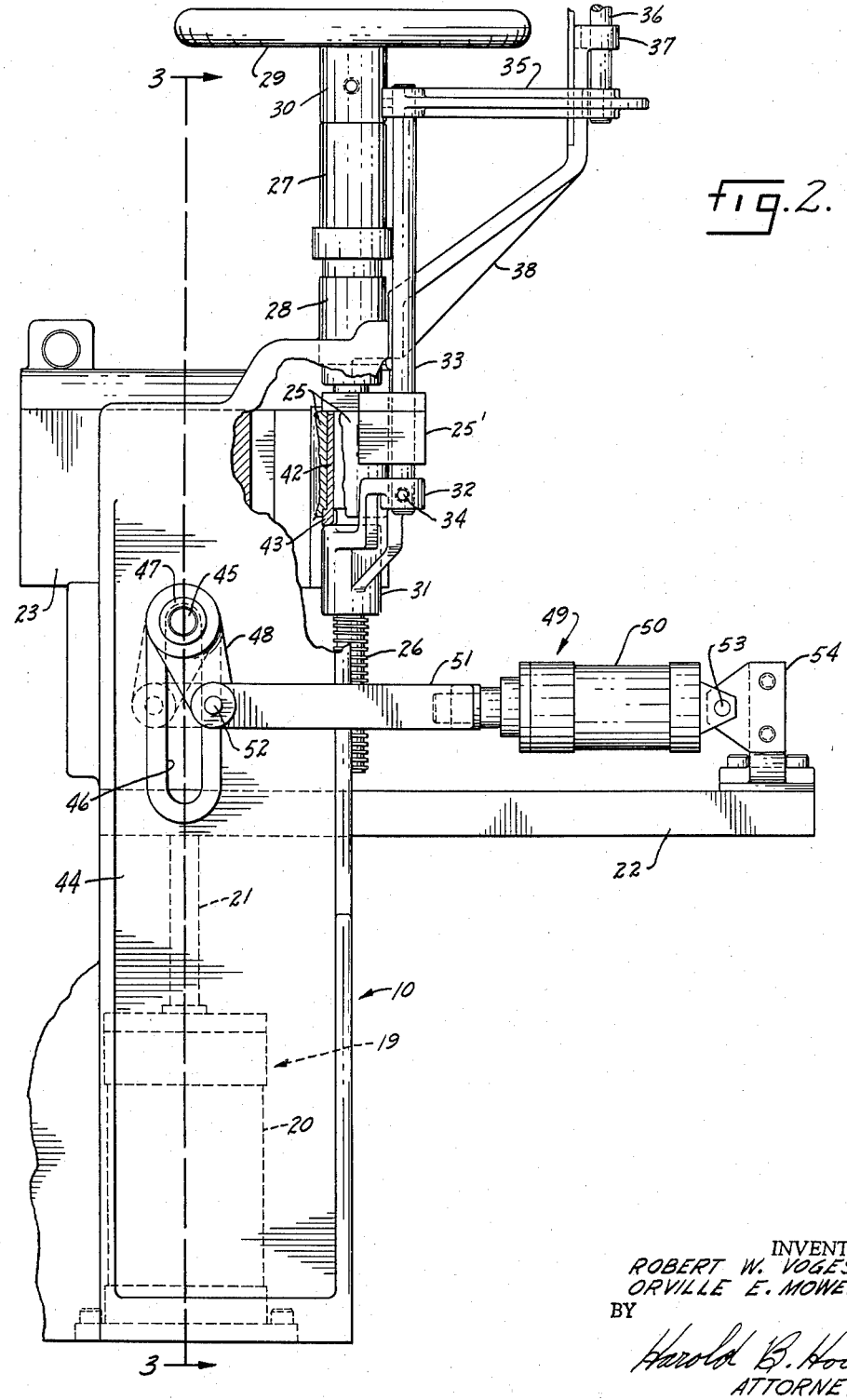

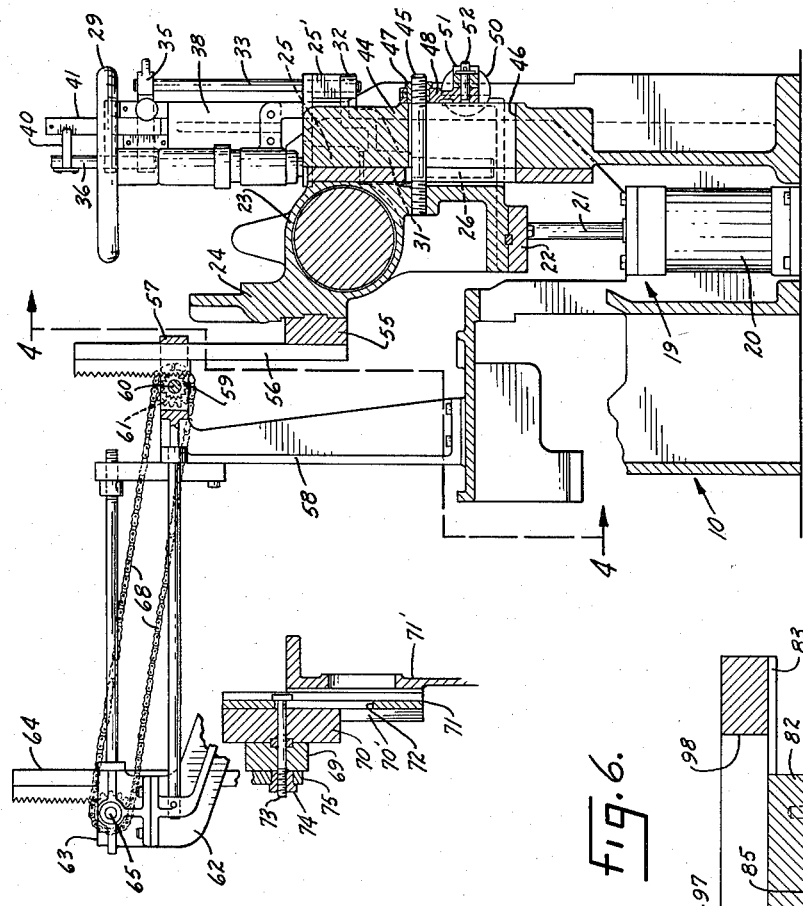

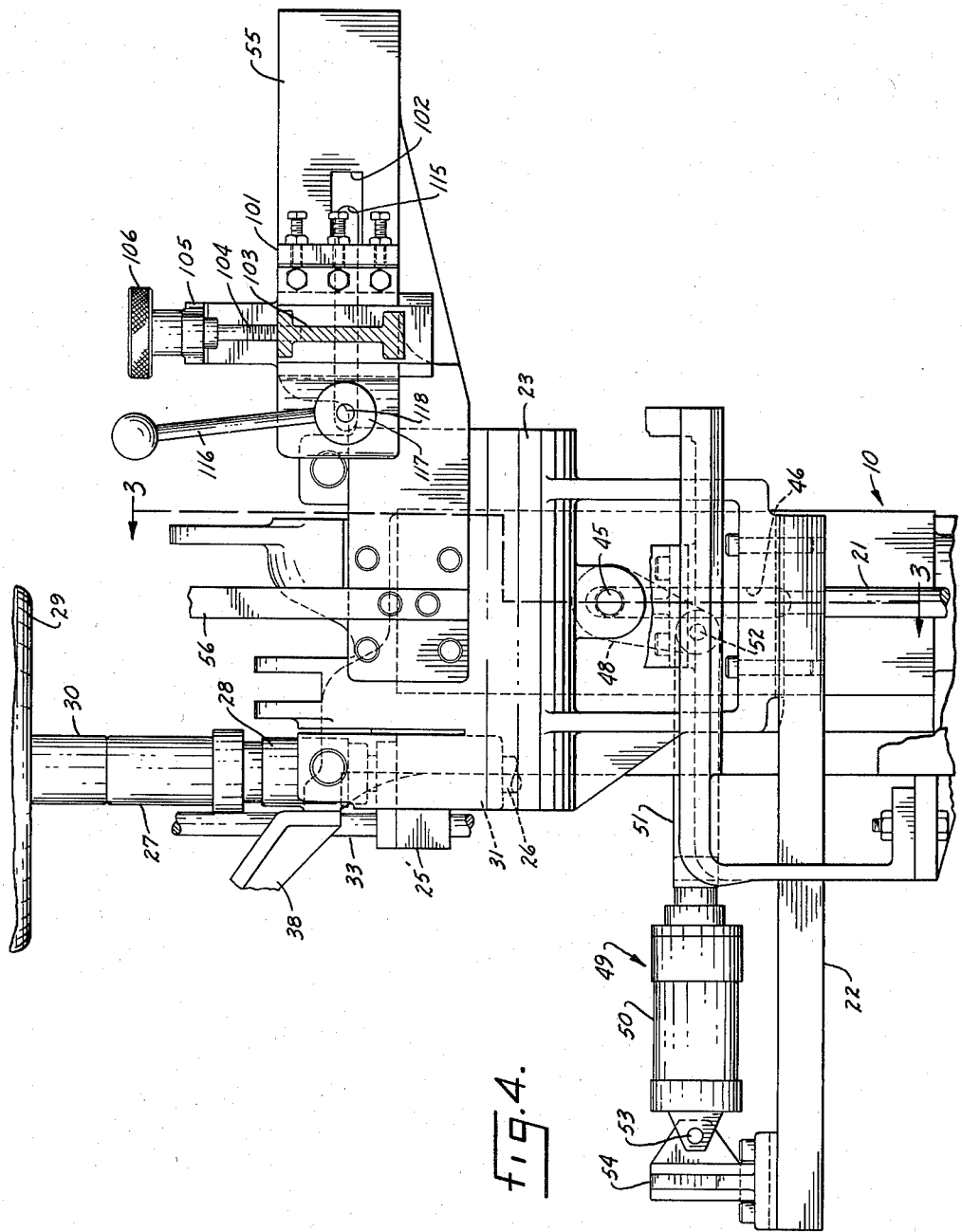

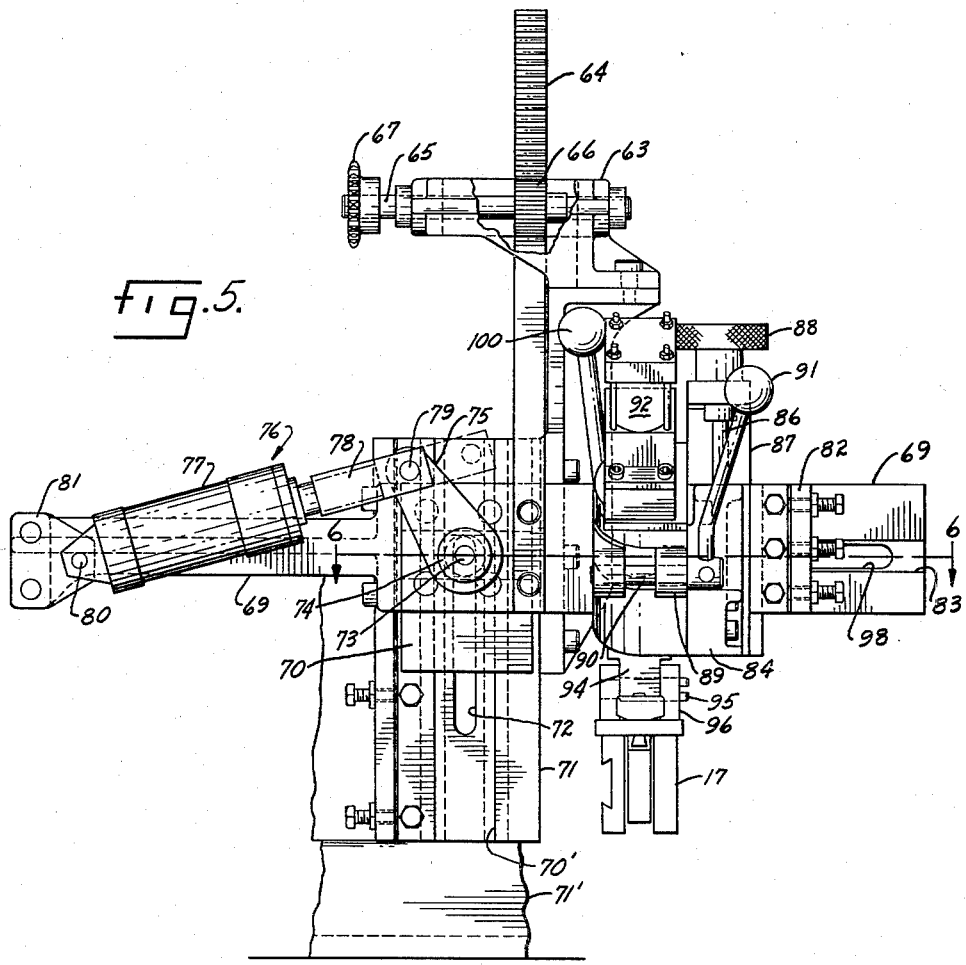

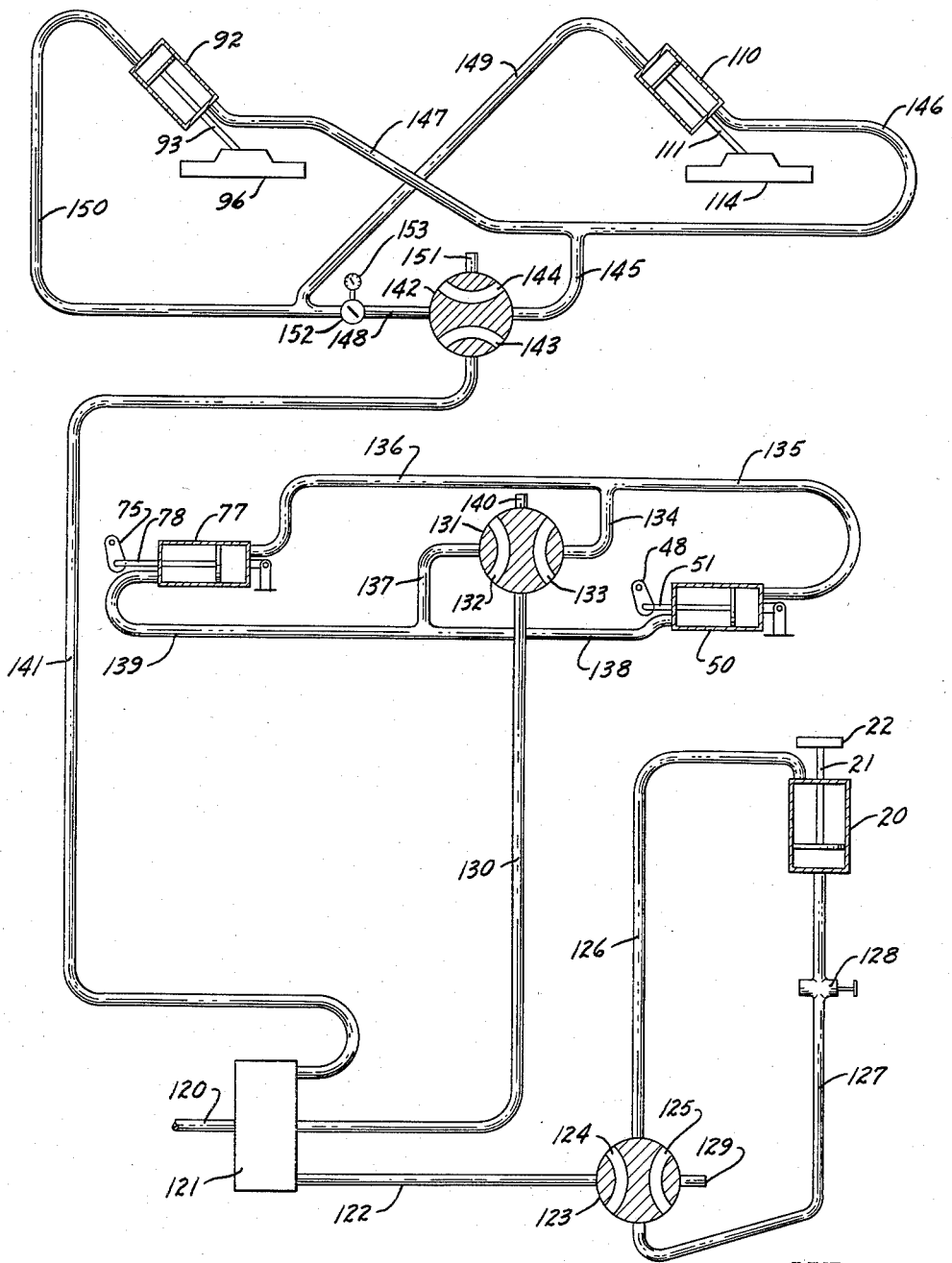

United States Patent Office 2,971,547
Patented Feb. 14, 1961

2,971,547
POWER OPERATED ADJUSTMENT FOR MOULDERS

Robert W. Voges and Orville E. Mowery, Wabash, Ind., assignors to The G. M. Diehl Machine Works, Inc., Wabash, Ind., a corporation of Indiana Filed Mar. 31, 1958, Ser. No. 725,109

9 Claims. (Cl. 144—242)

The present invention relates to power operated adjustment means for the top cutter head and the hold-downs of a moulder, and is more particularly directed to the provision of means whereby the setup of a moulder may be quickly, effectively and uniformly accomplished.

In a moulder, the most frequent change in setup required is a change in the location of the top cutter head relative to the work table; and it is obvious that, whenever the top cutter head is positionally adjusted, the work hold-down means must be correspondingly adjusted. Ideally, the hold-down bar will be so positioned, relative to the work-supporting table, as to exert an unvarying pressure upon the work which has been shaped by the top cutter; and it is customary to provide pressure-exerting means near that end of the hold-down bar which is adjacent the top cutter and a second pressure-exerting means near that end of the hold-down bar which is adjacent the bottom cutter, and to provide means whereby the respective pressure-exerting means may be independently positionally adjusted. It is, then, a further object of the present invention to provide means for automatically adjusting each pressure-exerting means to a position in which it will exert a predetermined degree of pressure, through the hold-down bar, upon the work, with one pressure-exerting means acting at a point near the top cutter and the other pressure-exerting means acting at a point near, and preferably slightly beyond, the bottom cutter.

Still further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Fig. 2 is an end elevation of certain parts of the machine taken on a plane just to the right of the top cutter as seen in Fig. 1;

Fig. 3 is a section taken substantially in the plane of line 3—3 of Fig. 2, with parts broken away for clarity of illustration;

Fig. 4 is a sectional view taken substantially in the planes indicated by the line 4—4 of Fig. 3;

Fig. 5 is an end elevation taken from the left hand end of Fig. 1, parts being broken away for clarity of illustration;

Fig. 6 (Sheet 3) is a fragmentary section taken substantially in the plane indicated by the line 6—6 of Fig. 5; and Fig. 7 is a diagram illustrating the fluid operating mechanism of the machine and the flow control means therefor.

Figure 1:
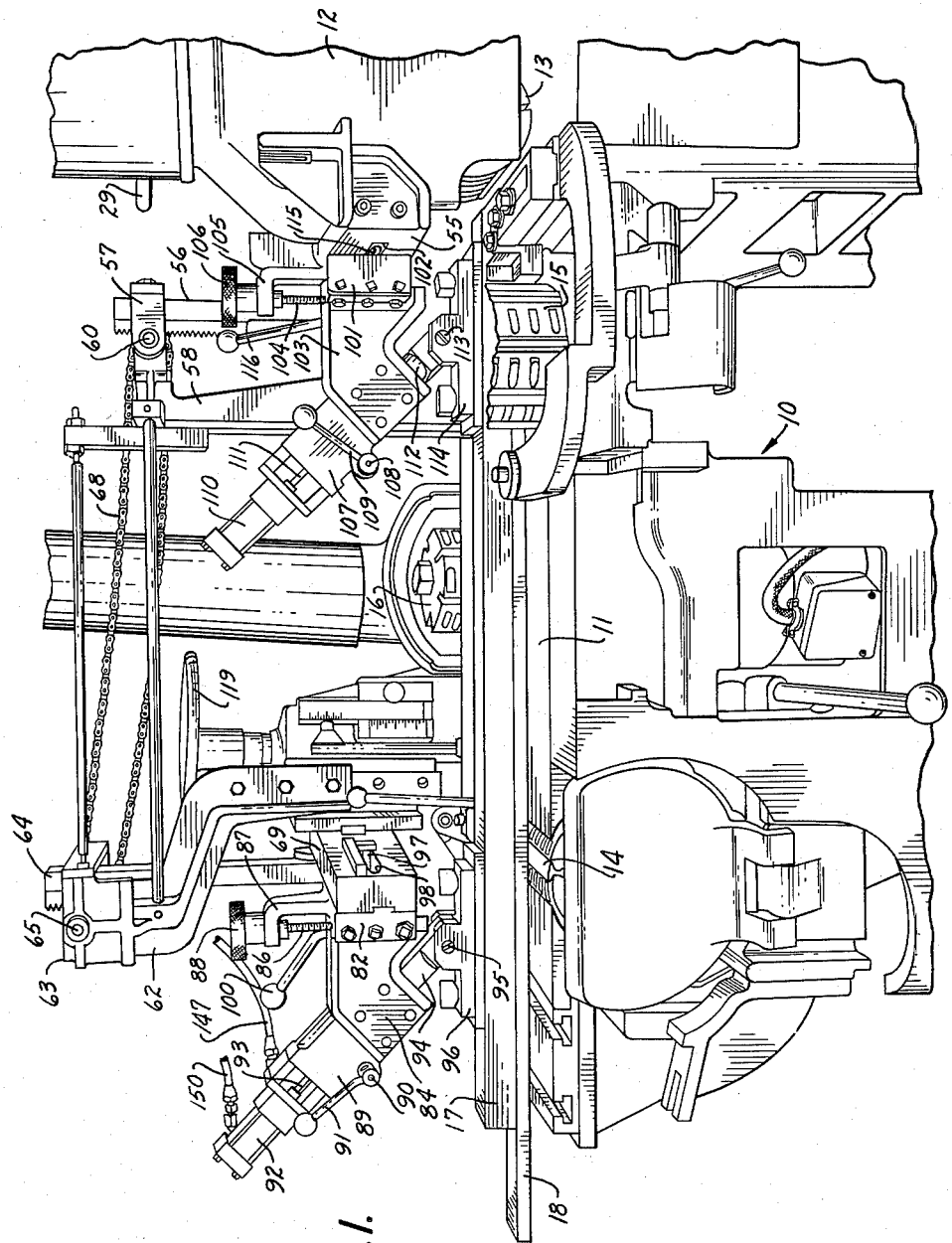
Fig. 1 is a perspective view of a machine embodying the present invention, taken from the front of the machine.

Referring, now, to Fig. 1 of the drawings, it will be seen that we have illustrated a moulder which, in many respects, is conventional and comprises a main frame 10 supporting a work table 11 above which is reciprocably supported a housing 12 carrying a conventional top cutter 13. Near the opposite end of the table, a conventional bottom cutter 14 is mounted to penetrate the table surface; and side cutters 15 and 16 are conventionally mounted adjacent the table 11. A hold-down bar 17 is, as usual, supported above the table 11 for vertical adjustment to bear upon the upper surface of work 18 moving through the machine from the right end thereof toward the left end thereof. Preferably, the right-hand end of bar 17 will have its lower edge somewhat rounded, for a purpose which will appear.

Referring, now, to Figs. 2 and 3, it will be seen that, adjacent the cutter 13 we support a fluid motor 19 comprising, in the illustrated embodiment of the invention, a cylinder 20 fixed with respect to the frame 10 and a piston reciprocably mounted in said cylinder and having a piston rod 21 projecting upwardly therefrom to support a mounting arm 22 which, in turn supports a top head yoke 23 provided with an arm or extension 24 and provided further with an offset sleeve 25.

A screw shaft 26 penetrates the sleeve 25 and is journalled in bearings 27 and 28 fixed with respect to the frame 10. The shaft 26 carries, at its upper end, a hand wheel 29 whereby said shaft may be rotated, said hand wheel having a hub 30 which is suitably fixed with respect to the shaft 26 and which is supported upon the bearing 27 to retain the shaft and hand wheel against vertical reciprocation.

Threadedly mounted upon the shaft 26 is a nut 31 formed with a laterally extending bracket 32 in which is mounted a rod 33, said rod being fixed to the bracket 32 by means of a set screw 34, or the like, and having a sliding fit in an offset spud 25' carried by the sleeve 25. At its upper end, the rod 33 carries an arm 35 which, at its distal end, supports an upright 36 which is guided in a bearing 37 carried by a bracket 38 fixed with respect to the frame 10. The upright 36 carries a pointer 40 which, as the nut 31 travels upwardly or downwardly relative to the screw shaft 26, will move relative to a scale 41 to indicate the current position of said nut 31.

A liner 42 within the sleeve 25 snugly surrounds the screw shaft 26, but said liner is not interiorly threaded and therefore will slide freely upon said screw shaft. At its lower end, the liner 42 provides an abutment surface 43 engageable with the upper end of the nut 31.

The yoke 23 has a guided, sliding engagement with a head-stand 44 which is fixed with respect to the frame 10; and a bolt 45, fixed with respect to the yoke, penetrates a vertical slot 46 in the head-stand 44 and, at its outer end, threadedly carries a clamp nut 47. A lever 48 is rotationally fixed to the nut 47 and is adapted to be swung about the axis of the screw 45 to move the nut into and out of clamping engagement with the head-stand. Quite obviously, when the nut is in such clamping engagement, the yoke 23 will be held in any desired adjusted position within the range of the slot 46.

A fluid motor 49 comprises a cylinder 50 in which is reciprocably mounted a piston which is connected to a piston rod 51 projecting from one end of the cylinder and pivotally connected, as at 52, to the distal end of the lever 48. The proximal end of the cylinder 50 is pivotally mounted, as at 53, upon a standard 54 supported from the mounting arm 22. The arrangement is such that movement of the piston rod 51 in one direction will clamp the yoke 23 to the head-stand 44 while movement of the piston rod 51 in the opposite direction will release the yoke for vertical movement relative to the headstand.

A top head pressure bar 55 is suitably mounted on the extension 24 of the yoke 23 and carries a rack 56. The rack 56 is guided in a yoke 57 carried by a bracket 58 secured to the frame 10, and meshes with a pinion 59 fixed to a shaft 60 journalled in the yoke 57. Outside the yoke, the shaft 60 fixedly carries a sprocket 61 for a purpose which will become apparent.

Upon a further bracket 62, fixed with respect to the frame 10, is mounted a second yoke 63 in which is guided a second rack 64. A shaft 64 is journalled in the yoke 63 and has fixed thereto (see Fig. 5) a pinion 66 meshing with the rack 64 and a sprocket 67. A chain 68 (see Figs. 1 and 3) is trained over the sprockets 61 and 67. It will be seen that, as the rack 56 moves, for instance, downwardly from its illustrated position in Fig. 3, it will drive the pinion 59 in a clockwise direction; the shaft 60, sprocket 61, chain 68, sprocket 67 and shaft 65 will drive the pinion 66 in the same direction to move the rack 64 downwardly. The parts are so proportioned and arranged that the downward movement of the rack 64 will be equal in extent to the downward movement of the rack 56.

The rack 64 is fixed (see Figs. 1, 3, 5 and 6) to a bottom head pressure bar 69 which, in turn, is attached to a slide 70 movable in a guide 70' formed in an element 71 which is secured to the bottom head-stand 71'. The member 71 is formed with a vertical slot 72 in which moves a screw 73 penetrating the members 71, 70 and 69 and having a clamp nut 74 threadedly mounted on its outer end. A lever 75 is rotationally fixed to the nut 74 and is swingable about the axis of the screw 73 to turn the nut 74 into and out of clamping engagement with the pressure bar 69 to lock said pressure bar and the slide 70 against movement with respect to the member 71. For operating the lever 75 we provide (see Fig. 5) a fluid motor 76 comprising a cylinder 77 in which is reciprocably received a piston fixed to a piston rod 78 projecting from an end of the cylinder and pivotally connected, as at 79, with the distal end of the lever 75. The proximal end of the cylinder 77 is pivotally connected, as at 80, to a bracket 81 carried on the pressure bar 69. The parts are so proportioned and designed that, when the piston rod 78 is moved in one direction, the nut 74 will be turned to clamp the pressure bar 69 against movement relative to the head-stand 71, and when the piston rod is moved in the opposite direction, the pressure bar will be released for movement relative to the head-stand.

A slide 82 is mounted in a guideway 83 formed in the pressure bar 69 for movement transversely of the direction of movement of the work piece 18 (see Figs. 1, 5 and 6). A bracket 84 is mounted for vertical movement relative to the slide 82 in a guideway 85 formed in said slide. A screw 86, journalled in a bracket 87 carried on the slide 82 has threaded engagement with the proximal end of the bracket 84, and said screw carries, at its upper end, a finger wheel 88. Obviously, rotation of the finger wheel 88 in on direction will lift the bracket 84, while rotation of said wheel in the oppoiste direction will depress the bracket 84.

A split sleeve 89 is carried by the bracket 84 and is provided with a clamping screw 90 (see Figs. 1 and 5) carrying an adjusting handle 91. Supported from the upper end of said sleeve is a fluid cylinder 92 in which is reciprocably mounted a piston having a piston rod 93 projecting from its lower end and secured to a slide 94 which is reciprocable in sleeve 89. By tightening the clamping screw 90 through operation of the handle 91 in one direction, the slide 94 may be restrained against reciprocation; but, as will appear hereinafter, said screw is normally not tightened, so that said slide is free for such reciprocation under the influence of the fluid motor 92. At its lower end, the slide 94 is pivotally connected, as at 95, to a shoe 96 suitably secured to the hold-down bar 17 near one end thereof.

The pressure bar 69 is formed, behind the guideway 83, with an elongated slot 98 (Figs. 1, 5 and 6) through which extends a headed bolt 97 carried by the slide 82. A nut 99 having a manipulating handle 100 is threadedly mounted on the outer end of the screw 97; and operation of the handle 100 in one direction will act to clamp the slide 82 against movement in its guideway 83, while operation of said handle in the opposite direction will free said slide for such movement.

Near the opposite end of the table 11, and close to the top cutter 13, a slide 101 (Figs. 1 and 4), similar to the slide 82, is similarly associated with the pressure bar 55 which is formed with a guideway 102 similar to the guideway 83. A bracket 103 like the bracket 84 is similarly mounted in said slide 101 and is adjustable relative thereto through the medium of a screw 104 journalled in a bracket 105 and carrying a finger wheel 106. A split sleeve 107 like the sleeve 89 is carried by the bracket 103 and is provided with a clamping screw 108 manipulable by a handle 109. A fluid cylinder 110 is carried from the upper end of the sleeve 107 to actuate a piston rod 111 connected to reciprocate a slide 112 like the slide 94, pivoted, as at 113, to a shoe 114 similar to the shoe 96 and secured to the hold-down bar 17 near the right hand end thereof. The bar 55 is provided with a slot 115 through which projects a screw 118 similar to the screw 97 and carrying a clamping nut 117 manipulable through a lever 116 similar to the lever 100.

A hand wheel 119 (Fig. 1) is included in the machine for the manipulation of a screw shaft (not shown) whereby the bottom cutter 14 and its associated parts may be vertically adjusted.

In Fig. 7, we have illustrated one form of fluid control system through which the several fluid motors of the present machine may be actuated. A conduit 120 may lead from a source of fluid under pressure to a manifold 121. From the manifold 121, a conduit 122 leads to a four-way valve 123 provided with passages 124 and 125 therethrough. A conduit 126 leads from the valve 123 to the upper end of the cylinder 20 and a conduit 127, in which may be inserted a control valve 128 for adjustably determining the rate of flow therethrough, leads from the bottom of the cylinder 20 back to the valve 123. The valve 123 is provided with a fourth port 129 which, if compressed air is used as the motive fluid, may discharge to the atmosphere or which, if liquid under pressure is used, may return to the source of pressure fluid.

With the valve 123 in the position illustrated, no fluid will flow therethrough. If, however, the valve 123 is turned in a counter clockwise direction, the passage 124 will provide communication between the conduit 122 and the conduit 127, while the passage 125 will establish communication between the conduit 126 and the exhaust 129. Thereupon, fluid under pressure will be supplied to the lower end of the cylinder 20 to lift the piston rod 21 and its supported mounting arm 22, while fluid will be exhausted from the upper end of the cylinder. If, however, the valve 123 is turned in a clockwise direction, fluid will be supplied to the upper end of the cylinder 20 and will be exhausted from the lower end thereof at a rate controlled by the setting of the valve 128.

It will be appreciated, of course, as the description proceeds that, if desired, a simple supply-exhaust valve could be substituted for the valve 123 and the conduit 126 could be eliminated.

From the manifold 121, a further conduit 130 extends to a valve 131 which, like the valve 123, is provided with passages 132 and 133. A conduit 134 leads from the valve 131 and joins branches 135 and 136, the first of which leads to the proximal end of the cylinder 50 and the second of which leads to the proximal end of the cylinder 77. A further conduit 137 leads from the valve 131 and is provided with branches 138 and 139, the first of which leads to the distal end of the cylinder 50 and the second of which leads to the distal end of the cylinder 77. The valve 131 is provided with an exhaust port 140 which may discharge to the atmosphere or may lead back to the source of pressure fluid.

It will be clear that, if the valve 131 is turned in a counter clockwise direction from its illustrated position, in which no fluid flow is permitted therethrough, the conduit 130 will be connected to the conduit 137, with its branches 138 and 139, through the passage 132, to supply fluid under pressure to the distal ends of the cylinders 50 and 77; while the conduit 134 and its branches 135 and 136 will be placed in communication with the exhaust port 140 to permit fluid to flow from the proximal ends of the cylinders 50 and 77 to discharge. Thus, the piston rods 51 and 78 will be moved toward the right to turn the levers 48 and 75, and their associated nuts, in a counter clockwise direction. If, on the other hand, the valve 131 is turned in a clockwise direction, the conduit 130 will be connected, through the passage 133, with the conduit 134 and its branches 135 and 136 to supply fluid under pressure to the proximal ends of the cylinders 50 and 77; while the distal ends of those cylinders will be connected, through the branches 138 and 139, the conduit 137 and the passage 132, to the exhaust port 140. Thereby, the piston rods 51 and 78 will be moved toward the left to turn the levers 48 and 75 and their associated nuts in a clockwise direction.

A still further conduit 141 leads from the manifold 121 to a valve 142 which is provided with passages 143 and 144. A conduit 145 leads from the valve 142 and is provided with branches 146 and 147 connected, respectively, with the lower ends of the cylinders 110 and 92. Another conduit 148 leads from the valve 142 and is provided with branches 149 and 150 connected, respectively, with the upper ends of the cylinders 110 and 92. Preferably, an adjustable pressure regulator 152, having a gauge 155 mounted therewith, is interposed in conduit 148. With the valve 142 in its illustrated position, no fluid will flow therethrough; but, if that valve is turned in a counter-clockwise direction, the passage 143 will establish communication between the conduit 141 and the conduit 145 to permit the flow of fluid under pressure through the branches 146 and 147 to the lower ends of the cylinders 110 and 92, while the passage 144 will provide communication between the conduit 148 and the exhaust port 151, whereby the piston rods 111 and 93, and their attached shoes 114 and 96, will be raised, provided the clamp screws 90 and 108 are in release positions. Conversely, if the valve 142 is turned in a clockwise direction, fluid will be supplied, through the passage 143, to the upper ends of the cylinders 92 and 110 and will be exhausted, through the passage 144, from the lower ends of said cylinders, whereby the shoes 96 and 114 will be urged downwardly.

*Operation*

In previously-known machines of the character here under consideration, adjustment of the machine to accommodate a new thickness of finished work is a slow process, made difficult, among other things, by the fact that the top cutter head and its associated parts as well as the top and bottom head pressure bars must all be moved by manual means. Since the top cutter head and the bottom pressure bar in such previously-known machines, have separate adjustment means, and because the shiftable mechanism is quite heavy, it is extremely difficult, in conventional machines, to bring that mechanism quickly to an exactly adjusted position. According to the present invention, the heavy work is done by power means, and the only thing which must be adjusted manually is the light nut 31 with its associated indicator parts.

The first step to be performed by an operator in making a new setup for the machine disclosed herein will be to unlock the nuts 47 and 74. This is done, of course, by operation of the motors 49 and 76 by rotating the valve 131 in the proper direction, as described above.

Now, the yoke 23 with its pressure bar 55, and the pressure bar 69 are free to move. Movement of the valve 123 in a counter-clockwise direction will supply pressure fluid to the lower end of motor cylinder 20 to project the piston rod 21 upwardly, carrying with it the yoke 23, the pressure bar 55 and the rack 56. Desirably, the piston rod 21 will be moved to the upper limit of its stroke. The sleeve 25, sliding freely on the screw shaft 26, will thus be moved to the upper limit of its stroke. As the rack 56 moves upwardly, it will rotate the pinion 59, shaft 60 and sprocket 61 in a counter clockwise direction to drive the chain 68 which, in turn, will drive the sprocket 67, the shaft 65 and the pinion 66 in a counter clockwise direction to lift the rack 64 and its attached pressure bar 69 and slide 70 to the upper limits of their strokes. Since the brackets 103 and 84 are supported from the pressure bars 55 and 69, the hold-down bar 17 will move upwardly with the yoke 23.

Thus, the entire weight of the mechanism will have been removed from the nut 31, and the hand wheel 29 may be rotated freely to shift the nut 31 into any selected position of adjustment within the range of its vertical stroke. Of course, the pointer 40 will be moved along the scale 41, as the nut 31 is moved, to indicate with complete exactitude the current position of the nut; and the operator will stop the pointer at whatever position corresponds to the desired new position of the nut 31. Because the nut 31 and its associated parts are very light, the screw shaft turns very freely and no difficulty is involved in manpulation of the hand wheel 29 to bring the pointer 40 to an exact selected relation to the scale 41.

Now, the operator will shift the valve 123 in a clockwise direction to connect the conduit 127, through passage 125, with outlet port 129, whereby the lower end of the motor cylinder 20 will be exhausted at a rate determined by the setting of the control valve 128. In the illustrated arrangement, downward movement of the piston rod 21 under the effect of gravity will be assisted by pressure fluid flowing through the conduit 122, passage 124 and conduit 126 to the upper end of the motor cylinder 20. Downward movement of the piston rod 21 continues until the abutment surface 43 of the sleeve 42 reaches supported engagement with the upper end of the nut 31. Thus, the yoke 23 and its associated elements will be stopped at precisely the position, relative to the table 11, indicated by the relation of the pointer 40 to the scale 41.

Now, the operator turns the valve 131 in the opposite direction to shift the piston rods 51 and 78 to turn the nuts 47 and 74 into clamping relation to their headstands, thus locking the pressure bars 55 and 69 ind esired relationship to the table surface, it being remembered that downward movement of the rack 56 with the pressure bar 55 will produce an identical degree of downward movement of the rack 64 and the pressure bar 69, through the pinion, sprocket and chain arrangement above described. The valves 123 and 131 can now be returned to their illustrated positions.

It has been found, in practice, that this adjujstment, as above described, can be accomplished, through the mechanism herein disclosed, in approximately thirty seconds; whereas the similar adjustment on a conventional machine lacking the power control mechanism of the present disclosure, ordinarily requires three to four minutes for its accomplishment and is frequently less than completely accurate.

Ordinarily, it is unnecessary to make any change in the setting of the shoes 96 and 114 in adjusting the machine for a new thickness of work. At the time when the cutter head 13 is mounted on its spindle, the operator will adjust the brackets 84 and 103 by manipulation of the finger wheels 88 and 106 to such positions that, when the slides 94 and 112 are fully projected, the bottom surface of the hold-down bar 17 will be disposed in a plane slightly below a plane tangent to the cutter head 13 and substantially parallel with the work table 11. Thus, when the above-described adjustments have been completed, the operator shifts the valve 142 to a position in which the passage 143 provides communication between the conduit 141 and the conduit 148 to supply fluid under pressure to the blank ends of the cylinders 92 and 110. He then adjusts the pressure regulator 152 to establish a predetermined degree of pressure, as indicated on the gauge 153, to the cylinders 92 and 110, and starts the conventional feed works. As a piece of work emerges from beneath the top cutter head 13, its machined top surface will engage the rounded end of the hold-down bar 17 and will move thereunder, lifting the bar slightly against the predetermined fluid pressure in the cylinder 110; and as the work continues to move, the left-hand end of the hold-down bar, and tis associated shoe 96, will likewise be lifted slightly against the pressure in the cylinder 92. Thus, a uniform pressure is exerted upon the work throughout the length of the hold-down bar 17, even though the work is thinned slightly as it passes the lower cutter head 14.

Under some circumstances, it may be desirable to hold the bar 17 rigidly in adjusted position relative to the table 11; and under those circumstances, the operator will set the shoes 96 and 114 to desired positions and then tighten the screws 90 and 108, by manipulation of the levers 91 and 109, to fix the slides 94 and 112 against movement relative to the sleeves 89 and 107. After so tightening those screws, of course, the valve 142 might be returned to its illustrated position.

In normal operation, however, the valve 142 remains in a position to maintain fluid pressure, at a predetermined value regulated by the valve 152, upon the pistons 93 and 111, for so long as the machine is in operation. When it becomes necessary to make a thickness adjustment, as described above, the valve 142 is temporarily moved to its illustrated position during adjustment of the cutter heads and their associated parts. Unless very substantial wear has occurred upon the cutter head 13, however, no separate adjustment of the shoes 96 and 114 is ordinarily required; but instead the valve 142 is shifted to provide communication between the conduits 141 and 148 and the operation of the machine proceeds in the manner above described.

Here, again, both speed and accuracy of setting are served by the mechanism herein disclosed, as contrasted with manual means for adjusting the shoes 96 and 114 relative to the brackets 35.

The screws 86 and 104 are, of course, used to effect major adjustments of the shoes 96 and 114 relative to their pressure bars 69 and 55. The slides 82 and 101 may be adjusted in their guideways 83 and 102, transversely of the table surface 11, for accommodation of work pieces of varying widths.

We claim as our invention:

1. In a moulder comprising a frame, a work table, cutter means oriented with respect to said table, and means for moving work upon said table past said cutter means, work hold-down means mounted for adjustment relative to said table, said hold-down means comprising a pair of parallel guides fixed with respect to said frame, elongated in a direction substantially perpendicular to said table and spaced from each other in the direction of work movement past said cutter means, a slide movably mounted on each of said guides, a hold-down bar, means supported by each of said slides and bearing on said hold-down bar to restrain movement of said bar away from said table, a reciprocating fluid motor including a cylinder element and a piston element, one of said motor elements being secured to said frame and the other of said motor elements being secured to one of said slides whereby relative movement of said motor elements in one direction will move said one slide away from said table and relative movement of said motor elements in the opposite direction will urge said one slide toward said table, means enforcing corresponding movement of the other of said slides in response to movement of said one slide, locking means for each of said slides actuable to secure said slides, respectively, in any position of adjustment relative to their guides, against movement by said motor, and fluid-operated means for actuating both of said locking means concurrently between slide-securing condition and slide-releasing condition.

2. In a moulder comprising a frame, a work table, cutter means oriented with respect to said table, and means for moving work upon said table past said cutter means, work hold-down means mounted for adjustment relative to said table, said hold-down means comprising a pair of parallel guides fixed with respect to said frame, elongated in a direction substantially perpendicular to said table and spaced from each other in the direction of work movement past said cutter means, a slide movably mounted on each of said guides, a hold-down bar, means supported by each of said slides and bearing on said hold-down bar to restrain movement of said bar away from said table, a reciprocating fluid motor including a cylinder element and a piston element, one of said motor elements being secured to said frame and the other of said motor elements being secured to one of said slides whereby relative movement of said motor elements in one direction will move said one slide away from said table and relative movement of said motor elements in the opposite direction will urge said one slide toward said table, means enforcing corresponding movement of the other of said slides in response to movement of said one slide, clamp means for each slide, each clamping means comprising a threaded member fixed with respect to one element of its slide-and-guide assembly and penetrating the other element of said assembly and a second member threadedly mounted on said threaded member and adjustable, by relative rotation, along said threaded member into and out of clamping engagement with said other element of said assembly, a lever fixed to one member of each of said clamp means, a fluid motor connected to each lever to swing the same about the axis of said threaded member, and common valve means to control the flow of fluid under pressure to and from both of said last-named fluid motors.

3. In a moulder comprising a frame, a work table, cutter means oriented with respect to said table, and means for moving work upon said table past said cutter means, work hold-down means mounted for adjustment relative to said table, said hold-down means comprising a pair of parallel guides fixed with respect to said frame, elongated in a direction substantially perpendicular to said table and spaced from each other in the direction of work movement past said cutter means, a slide movably mounted on each of said guides, a hold-down bar, means supported by each of said slides and bearing on said hold-down bar to restrain movement of said bar away from said table, a reciprocating fluid motor including a cylinder element and a piston element, one of said motor elements being secured to said frame and the other of said motor elements being secured to one of said slides whereby relative movement of said motor elements in one direction will move said one slide away from said table and relative movement of said motor elements in the opposite direction will urge said one slide toward said table, a rack mounted to move with each slide, a pinion meshing with each rack, each pinion being mounted for rotation about an axis fixed with respect to said frame, a sprocket fixed to rotate with each pinion, and a chain operatively connecting said sprockets, said racks, pinions and sprockets being designed and arranged to enforce corresponding movement of the other of said slides in response to movement of said one slide.

4. In a moulder comprising a frame, a work table, cutter means oriented with respect to said table, and means for moving work upon said table past said cutter means, work hold-down means mounted for adjustment relative to said table, said hold-down means comprising a pair of parallel guides fixed with respect to said frame, elongated in a direction substantially perpendicular to said table and spaced from each other in the direction of work movement past said cutter means, a slide movably mounted on each of said guides, a hold-down bar, a reciprocating fluid motor supported from each slide and comprising a cylinder element and a piston element, one of said elements of each motor being fixed with respect to its slide and the other element of each motor depending from its companion fixed element toward said table to bear upon said hold-down bar, valve means for controlling the flow of fluid under pressure to and from said motors to lift or to depress said other motor elements concurrently, clamp means carried by each slide and engageable, at times, with said other element of the associated motor to restrain the same against movement relative to said one motor element, a further reciprocating fluid motor including a cylinder element and a piston element, one of said further motor elements being secured to said frame and the other of said further motor elements being secured to one of said slides whereby relative movement of said further motor elements in one direction will move said one slide substantially perpendicularly away from the work-supporting surface of said table and relative movement of said further motor elements in the opposite direction will urge said one slide toward said table, and means enforcing corresponding movement of the other of said slides in response to movement of said one slide.

5. In a moulder comprising a frame, a work table, cutter means oriented with respect to said table, and means for moving work upon said table past said cutter means, work hold-down mounted for adjustment relative to said table, said hold-down means comprising a pair of parallel guides fixed with respect to said frame, elongated in a direction substantially perpendicular to said table and spaced from each other in the direction of work movement past said cutter means, a slide movably mounted on each of said guides, a hold-down bar, means supported by each of said slides and bearing on said hold-down bar to restrain movement of said bar away from said table, a screw shaft mounted upon an axis perpendicular with respect to said table for rotation about its own axis but held against axial movement, a nut threadedly mounted on said screw shaft and held against rotation therewith, and cooperating abutment means movable, respectively, with said nut and with one of said slides and mutually engageable, at times, to support said slides from said nut and to limit movement of said slides toward said table in accordance with the current position of adjustment of said nut, a reciprocating fluid motor including a cylinder element and a piston element, one of said motor elements being secured to said frame and the other of said motor elements being secured to one of said slides whereby relative movement of said motor elements in one direction will lift said abutment means which is movable with said one slide to support said slides wholly independently of said abutment means which is movable with said nut to facilitate adjustment of said nut, and means enforcing corresponding movement of the other of said slides in response to movement of said one slide.

6. In a moulder comprising a frame, a work table, cutter means oriented with respect to said table, and means for moving work upon said table past said cutter means, work hold-down means mounted for adjustment relative to said table, said hold-down means comprising a pair of parallel guides fixed with respect to said frame, elongated in a direction substantially perpendicular to said table and spaced from each other in the direction of work movement past said cutter means, a slide movably mounted on each of said guides, a hold-down bar, means supported by each of said slides and bearing on said hold-down bar to restrain movement of said bar away from said table, a reciprocating fluid motor including a cylinder element and a piston element, one of said motor elements being secured to said frame and the other of said motor elements being secured to one of said slides whereby relative movement of said motor elements in one direction will move said one slide away from said table and relative movement of said motor elements in the opposite direction will urge said one slide toward said table, means enforcing corresponding movement of the other of said slides in response to movement of said one slide, said means comprising a rack mounted to move with each slide, a pinion meshing with each rack, each pinion being mounted for rotation about an axis fixed with respect to said frame, a sprocket fixed to rotate with each pinion, and a chain operatively connecting said sprockets, and means for mechanically securing said slides, in any position of adjustment relative to their guides, against movement by said motor.

7. In a moulder comprising a frame, a work table, cutter means oriented with respect to said table, and means for moving work upon said table past said cutter means, work hold-down means mounted for adjustment relative to said table, said hold-down means comprising a pair of parallel guides fired with respect to said frame, elongated in a direction substantially perpendicular to said table and spaced from each other in the direction of work movement past said cutter means, a slide movably mounted on each of said guides, a hold-down bar, means supported by each of said slides and bearing on said hold-down bar to restrain movement of said bar away from said table, a reciprocating fluid motor including a cylinder element and a piston element, one of said motor elements being secured to said frame and the other of said motor elements being secured to one of said slides whereby relative movement of said motor elements in one direction will move said one slide away from said table and relative movement of said motor elements in the opposite direction will urge said one slide toward said table, means enforcing corresponding movement of the other of said slides in response to movement of said one slide, said means comprising a rack mounted to move with each slide, a pinion meshing with each rack, each pinion being mounted for rotation about an axis fixed with respect to said frame, a sprocket fixed to rotate with each pinion, and a chain operatively connecting said sprockets, locking means for each of said slides actuable to secure said slides, respectively, in any position of adjustment relative to their guides, against movement by said motor, and fluid-operated means for actuating said locking means between slide-securing condition and slide-releasing condition.

8. In a moulder comprising a frame, a work table, cutter means oriented with respect to said table, and means for moving work upon said table past said cutter means, work holding means mounted for adjustment relative to said table, said hold-down means comprising a pair of parallel guides fixed with respect to said frame, elongated in a direction substantially perpendicular to said table and spaced from each other in the direction of work movement past said cutter means, a slide movably mounted on each of said guides, a hold-down bar, means supported by each of said slides and bearing on said hold-down bar to restrain movement of said bar away from said table, a reciprocating fluid motor including a cylinder element and a piston element, one of said motor elements being secured to said frame and the other of said motor elements being secured to one of said slides whereby relative movement of said motor elements in one direction will move said one slide away from said table and relative movement of said motor elements in the opposite direction will urge said one slide toward said table, means enforcing corresponding movement of the other of said slides in response to movement of said one slide, said means comprising a rack mounted to move with each slide, a pinion meshing with each rack, each pinion being mounted for rotation about an axis fixed with respect to said frame, a sprocket fixed to rotate with each pinion, and a chain operatively connecting said sprockets, clamp means for each slide, each clamping means comprising a threaded member fixed with respect to one element of its slide-and-guide assembly and penetrating the other element of said assembly and a second member threadedly mounted on said threaded member and adjustable, by relative rotation, along said threaded member into and out of clamping engagement with said other element of said assembly, and means for concurrently effecting such relative rotation of said members.

9. The device of claim 2 in which said means enforcing corresponding movement of the other of said slides in response to movement of said one slide comprises a rack mounted to move with each slide, a pinion meshing with each rack, each pinion being mounted for rotation about an axis fixed with respect to said frame, a sprocket fixed to rotate with each pinion, and a chain operatively connecting said sprockets.

References Cited in the file of this patent

UNITED STATES PATENTS

| | | |
|---|---|---|
| 241,700 | Nichols | May 17, 1881 |
| 462,213 | Miller | Oct. 27, 1891 |
| 780,921 | Trout | Jan. 24, 1905 |
| 851,302 | McClune | Apr. 23, 1907 |
| 1,611,543 | Martin | Dec. 21, 1926 |
| 1,696,502 | Peterson | Dec. 25, 1928 |
| 1,794,350 | Osterberg | Feb. 24, 1931 |
| 2,435,765 | Anderson | Feb. 10, 1948 |
| 2,530,880 | Hermann | Nov. 21, 1950 |
| 2,642,902 | Carey | June 23, 1953 |
| 2,714,906 | Peterson | Aug. 9, 1955 |
| 2,777,485 | Farrow | Jan. 15, 1957 |
| 2,816,468 | Lawrenow | Dec. 17, 1957 |

FOREIGN PATENTS

| | | |
|---|---|---|
| 205,609 | Switzerland | Sept. 16, 1939 |

UNITED STATES PATENT OFFICE
CERTIFICATION OF CORRECTION

Patent No. 2,971,547                          February 14, 1961

Robert W. Voges et al.

It is hereby certified that error appears in the above numbered patent requiring correction and that the said Letters Patent should read as corrected below.

Column 3, line 9, for "shaft 64" read -- shaft 65 --; line 56, for "on" read -- one --; column 7, line 16, for "tis" read -- its --; column 9, line 33, after "hold-down" insert -- means --; column 10, line 22, for "fired" read -- fixed --; line 52, for "holding" read -- hold-down --.

Signed and sealed this 20th day of June 1961.

(SEAL)
Attest:

ERNEST W. SWIDER
Attesting Officer

DAVID L. LADD
Commissioner of Patents